(12) United States Patent
Tamura et al.

(10) Patent No.: US 8,328,602 B2
(45) Date of Patent: Dec. 11, 2012

(54) GLASS SUBSTRATE FOR INFORMATION RECORDING MEDIUM AND METHOD FOR MANUFACTURING THE SAME, AND MAGNETIC RECORDING MEDIUM

(75) Inventors: Masahiko Tamura, Ayutthaya (TH); Toru Momose, Tokyo (JP); Katsuaki Miyatani, Tokyo (JP); Tetsuya Nakashima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 10 days.

(21) Appl. No.: 12/833,410

(22) Filed: Jul. 9, 2010

(65) Prior Publication Data

US 2011/0008649 A1    Jan. 13, 2011

(30) Foreign Application Priority Data

Jul. 9, 2009   (JP) ................................ 2009-162746

(51) Int. Cl.
*C03B 27/00*   (2006.01)
*B24C 3/08*    (2006.01)
*G11B 9/04*    (2006.01)

(52) U.S. Cl. .............. 451/41; 451/37; 428/846.9; 65/62

(58) Field of Classification Search .............. 428/848.9, 428/846.9, 848.8; 216/88; 438/691, 692; 451/29.12, 30.14, 61, 62, 58, 97, 37, 41; 65/58, 97, 61, 62, 29.12, 30.14, 33.7; 29/603.11; 134/1

See application file for complete search history.

(56) References Cited

U.S. PATENT DOCUMENTS

| | | | |
|---|---|---|---|
| 6,568,995 B1 | 5/2003 | Mitani et al. | |
| 7,661,188 B2 | 2/2010 | Marumo | |
| 2005/0172670 A1* | 8/2005 | Kamiya | 65/30.14 |

(Continued)

FOREIGN PATENT DOCUMENTS

JP    2004-59419    2/2004

(Continued)

OTHER PUBLICATIONS

Koike JP 2008090898, Apr. 2008 machine translation.*
U.S. Appl. No. 13/033,940, filed Feb. 24, 2011, Momose, et al.

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

The present invention relates to a method for manufacturing a glass substrate for information recording medium, the method including: a lapping step of lapping a circular glass plate made of an alkali aluminosilicate glass; and a subsequent cerium oxide polishing step of polishing the circular glass plate with a slurry containing a cerium oxide abrasive, in which a difference ($SiO_2-Al_2O_3$) obtained by subtracting an $Al_2O_3$ content from an $SiO_2$ content in the alkali aluminosilicate glass is 62% by mole or less; and in which the method further includes: subsequently to the cerium oxide polishing step, a cleaning step of cleaning the circular glass plate with a cleaning liquid having a sulfuric acid concentration of 20% by mass or more and 80% by mass or less and a hydrogen peroxide concentration of 1% by mass or more and 10% by mass or less at a liquid temperature of 50° C. or higher and 100° C. or lower, and after the cleaning step, a finish polishing step of polishing a main surface of the circular glass plate with a slurry containing a colloidal silica abrasive.

16 Claims, 1 Drawing Sheet

U.S. PATENT DOCUMENTS

| | | | |
|---|---|---|---|
| 2006/0070980 A1* | 4/2006 | Marumo et al. | 216/88 |
| 2007/0066066 A1* | 3/2007 | Kojima et al. | 438/691 |
| 2007/0256703 A1* | 11/2007 | Ikuta | 134/1 |
| 2009/0233529 A1* | 9/2009 | Ueda | 451/41 |

FOREIGN PATENT DOCUMENTS

| | | |
|---|---|---|
| JP | 2006-99847 | 4/2006 |
| JP | 2008-90898 | 4/2008 |

* cited by examiner

_GLASS SUBSTRATE FOR INFORMATION RECORDING MEDIUM AND METHOD FOR MANUFACTURING THE SAME, AND MAGNETIC RECORDING MEDIUM_

FIELD OF THE INVENTION

The present invention relates to a glass substrate for information recording medium and a method for manufacturing the same, and relates to a magnetic recording medium. In more detail, the invention relates to an improvement of a cleaning step after polishing of a glass substrate.

BACKGROUND OF THE INVENTION

In recent years, there are involved two serious problems regarding a glass substrate toward realization of a high capacity of a hard disk. One of them is concerned with mechanical characteristics at the time of high-speed rotation such as vibration characteristic and strength; and the other is concerned with removal of a contamination remaining on the glass substrate.

In order to improve the vibration characteristic or strength at the time of high-speed rotation, it is necessary to use a glass substrate having an appropriate glass composition taking into consideration various characteristics such as Young's modulus, specific modulus, specific gravity, thermal expansion coefficient, scratch resistance and fracture toughness. In order to achieve those characteristics, it is known that an alkali aluminosilicate glass of a $SiO_2$—$Al_2O_3$—$R_2O$ system ($R_2O$ represents an alkali metal oxide) is suitable, and in particular, $Al_2O_3$ is an effective component for improving mechanical characteristics.

On the other hand, as for the residue on the glass substrate, it is known that a cerium oxide abrasive which is suitably used for glass polishing from reasons, for example, a high polishing rate remains as a contamination. In a manufacturing step of a glass substrate, there may be the case where after the main surface and edge of a circular glass plate cut out from a glass plate is polished with a slurry containing a cerium oxide abrasive, in order to further flatten the main surface, final polishing with a slurry containing a colloidal silica abrasive is performed. At that time, even when the cerium oxide abrasive remains on the main surface, it is removed by the final polishing; however, it may be considered that the cerium oxide abrasive deposited onto the edge remains without being removed and is reattached onto the main surface in a cleaning step after the final polishing.

Under such a background, it is desirable to completely remove the cerium oxide abrasive, and a cleaning liquid containing an inorganic acid and ascorbic acid is proposed (see, for example, Patent Documents 1 and 2). According to this cleaning liquid, the cerium oxide abrasive is dissolved and removed by the action of the inorganic acid and ascorbic acid.

It is also proposed to use a cleaning liquid composed mainly of heated sulfuric acid for cleaning in a final step (see, for example, Patent Document 3).

Patent Document 1: JP-A-2006-99847 (claims)
Patent Document 2: JP-A-2004-59419 (claims)
Patent Document 3: JP-A-2008-90898 (claims)

SUMMARY OF THE INVENTION

However, the present inventors verified the foregoing cleaning technologies. As a result, it has been confirmed that according to cleaning with a cleaning liquid containing ascorbic acid and an inorganic acid, though it is possible to minimize a cerium oxide abrasive remaining on the edge of a circular glass plate, there may be the case where the cerium oxide abrasive cannot be completely removed. Also, it has been confirmed that since this cleaning liquid has a pH as low as from 1 to 2, there may be the case where when applied to a circular glass plate made of an alkali aluminosilicate glass, it causes large surface roughing.

On the other hand, in the case of using a cleaning liquid composed mainly of heated sulfuric acid for cleaning after a final polishing step, it has been confirmed that though a cerium oxide abrasive remaining on the edge of a glass substrate can be substantially completely removed, there may be the case where large surface roughing occurs.

In view of the foregoing problems, the invention has been made. As for a circular glass plate made of an alkali aluminosilicate glass, in a method for manufacturing a glass substrate for information recording medium through a polishing step with a slurry containing a cerium oxide abrasive, an object of the invention is to provide a glass substrate for information recording medium in which not only remaining of the cerium oxide abrasive is suppressed, but surface roughing of the main surface is minimized.

The invention provides a glass substrate for information recording medium and a method for manufacturing the same, and a magnetic recording medium as described below.

(1) A method for manufacturing a glass substrate for information recording medium, the method comprising: a lapping step of lapping a circular glass plate made of an alkali aluminosilicate glass; and a subsequent cerium oxide polishing step of polishing the circular glass plate with a slurry containing a cerium oxide abrasive, wherein a difference ($SiO_2$–$Al_2O_3$) obtained by subtracting an $Al_2O_3$ content from an $SiO_2$ content in the alkali aluminosilicate glass is 62% by mole or less;

and wherein the method further comprises:

subsequently to the cerium oxide polishing step, a cleaning step of cleaning the circular glass plate with a cleaning liquid having a sulfuric acid concentration of 20% by mass or more and 80% by mass or less and a hydrogen peroxide concentration of 1% by mass or more and 10% by mass or less at a liquid temperature of 50° C. or higher and 100° C. or lower, and after the cleaning step, a finish polishing step of polishing a main surface of the circular glass plate with a slurry containing a colloidal silica abrasive.

(2) The method for manufacturing a glass substrate for information recording medium according to (1), wherein the alkali aluminosilicate glass has a composition of from 55 to 75% by mole of $SiO_2$, from 5 to 17% by mole of $Al_2O_3$, from 4 to 27% by mole of $Li_2O+Na_2O+K_2O$ (hereinafter, also referred to as $R_2O$), from 0 to 20% by mole of $MgO+CaO+SrO+BaO$ (hereinafter, also referred to as R'O), provided that $SiO_2+Al_2O_3+R_2O+R'O$ is 90% by mole or more.

(3) The method for manufacturing a glass substrate for information recording medium according to (2), wherein in the composition of the alkali aluminosilicate glass, $SiO_2$ is 63% by mole or more, $R_2O$ is 16% by mole or more, and R'O is from 0 to 10% by mole.

Incidentally, for example, the phrase "$R_2O$ is 16% by mole or more" means that at least one component of $Li_2O$, $Na_2O$ and $K_2O$ is contained in the alkali aluminosilicate glass and the total amount of $Li_2O$, $Na_2O$ and $K_2O$ is 16% by mole or more. Additionally, the phrase "R'O is from 0 to 10% by mole" also means that at least one component of MgO, CaO, SrO and BaO is contained in the alkali aluminosilicate glass and the total amount of MgO, CaO, SrO and BaO is from 0 to 10% by mole.

(4) The method for manufacturing a glass substrate for information recording medium according to any one of (1) to (3), wherein the colloidal silica abrasive has an average particle size of 10 nm or more and 50 nm or less.

(5) The method for manufacturing a glass substrate for information recording medium according to (4), wherein the slurry containing a colloidal silica abrasive has a pH of 1 or more and 6 or less.

(6) The method for manufacturing a glass substrate for information recording medium according to any one of (1) to (5), wherein the finish polishing step is performed subsequently to the cleaning step.

(7) The method for manufacturing a glass substrate for information recording medium according to (6), wherein the difference ($SiO_2-Al_2O_3$) obtained by subtracting an $Al_2O_3$ content from an $SiO_2$ content in the alkali aluminosilicate glass is 50% by mole or more and 62% by mole or less.

(8) The method for manufacturing a glass substrate for information recording medium according to (7), wherein the alkali aluminosilicate glass has a composition of from 63 to 71% by mole of $SiO_2$, from 7 to 12.5% by mole of $Al_2O_3$, from 16 to 24% by mole of $R_2O$, from 0 to 10% by mole of MgO+CaO+SrO+BaO, provided that $SiO_2+Al_2O_3+R_2O+R'O$ is 90% by mole or more.

(9) The method for manufacturing a glass substrate for information recording medium according to any one of (1) to (5), wherein a repolishing step of polishing the main surface of the circular glass plate with a slurry containing a cerium oxide abrasive and using a polishing pad having a foamed resin layer having a Shore A hardness of 60° or less is included between the cleaning step and the finish polishing step.

(10) The method for manufacturing a glass substrate for information recording medium according to (4) or (5), wherein a step of polishing the main surface of the circular glass plate with a slurry containing a colloidal silica abrasive having an average particle size of more than 50 nm and 100 nm or less and having a pH of 8 or more and 12 or less is included between the cleaning step and the finish polishing step.

(11) The method for manufacturing a glass substrate for information recording medium according to (9) or (10), wherein the difference ($SiO_2-Al_2O_3$) obtained by subtracting an $Al_2O_3$ content from an $SiO_2$ content in the alkali aluminosilicate glass is 45% by mole or more and less than 50% by mole.

(12) The method for manufacturing a glass substrate for information recording medium according to (11), wherein the alkali aluminosilicate glass has a composition of from 60% by mole or more and less than 63% by mole of $SiO_2$, from 12.5 to 15% by mole of $Al_2O_3$, from 18 to 22% by mole of $R_2O$, from 0 to 6% by mole of R'O, provided that $SiO_2+Al_2O_3+R_2O+R'O$ is 90% by mole or more.

(13) The method for manufacturing a glass substrate for information recording medium according to any one of (1) to (12), wherein in the cleaning step, the circular glass plate is dipped in the cleaning liquid at 50° C. or higher and lower than 60° C. for 25 minutes or more and 30 minutes or less, the cleaning liquid at 60° C. or higher and lower than 70° C. for 15 minutes or more and 30 minutes or less, or the cleaning liquid at 70° C. or higher and 100° C. or lower for 5 minutes or more and 30 minutes or less.

(14) The method for manufacturing a glass substrate for information recording medium according to any one of (1) to (13), wherein in the finish polishing step, a root mean square roughness (Rms) of the main surface of the circular glass plate is regulated to 0.15 nm or less.

(15) The method for manufacturing a glass substrate for information recording medium according to any one of (1) to (14), wherein a cleaning step of cleaning the circular glass plate with an alkaline detergent having a pH of 10 or more is included after the finish polishing step.

(16) A glass substrate for information recording medium, manufactured by the method according to any one of (1) to (15).

(17) A magnetic recording medium comprising a magnetic recording layer provided on the main surface of the glass substrate for information recording medium according to (16).

The present inventors examined a phenomenon in which when a cleaning liquid composed mainly of heated sulfuric acid is used for cleaning after a final polishing step of a circular glass plate, large surface roughing occurs. As a result, it has been found that the glass of such a circular glass plate is inferior in acid resistance and that the foregoing ($SiO_2-Al_2O_3$) value of the glass influences such acid resistance. Also, it has been found that such surface roughing is caused due to uneven leaching and that in order to restore this, it is effective to provide a finish polishing step of performing polishing with a slurry containing a colloidal silica abrasive. These findings have led to accomplishment of the invention.

Also, it has been found that in a glass having lower acid resistance, by performing polishing with a slurry containing a cerium oxide abrasive and using a suede pad prior to the polishing with a slurry containing a colloidal silica abrasive, a substrate having a favorable surface roughness is obtained, leading to accomplishment of the invention.

According to the invention, since a cleaning liquid obtained by adding hydrogen peroxide to heated sulfuric acid is used for the cleaning step, even when a polishing step of polishing a circular glass plate made of an alkali aluminosilicate glass with a slurry containing a cerium oxide abrasive is included, it is possible to make the abrasive substantially free from remaining. There is provided a glass substrate for magnetic recording medium in which surface roughing of the main surface to be caused by uneven leaching is restored so that flatness thereof becomes good and which is thoroughly adaptive with a high recording capacity which will be demanded in the future.

DETAILED DESCRIPTION OF THE INVENTION

The invention is hereunder described in detail by reference to the following example regarding the manufacture of a glass substrate for magnetic disk (glass substrate for hard disk), but it should not be construed that the invention is limited thereto.

First of all, a circular glass plate is cut out from a glass plate made of an alkali aluminosilicate glass having the following composition.

$SiO_2$: 55 to 75% by mole
$Al_2O_3$: 5 to 17% by mole
$R_2O$: 4 to 27% by mole
R'O: 0 to 20% by mole
$SiO_2+Al_2O_3+R_2O+R'O$: 90% by mole or more
($SiO_2-Al_2O_3$): 62% or less In the foregoing alkali aluminosilicate glass, $SiO_2$ is a component for forming a network of glass and is essential. When the content of $SiO_2$ is less than 55% by mole, a specific gravity becomes large; the glass is liable to be scratched; a devitrification temperature rises so that the glass becomes instable; and acid resistance is lowered. The content of $SiO_2$ is preferably 60% by mole or more, more preferably 61% by mole or more, especially preferably 62% by mole or more, most preferably 63% by mole or more, and typically 64% by mole or more. However, when the content of $SiO_2$ exceeds 75% by mole, a Young's modulus becomes low; a specific modulus becomes low; a thermal expansion coefficient becomes small; and viscosity becomes too high so that melting of glass becomes difficult. The content of $SiO_2$ is preferably 71% by mole or less, more preferably 70% by mole or less, and most preferably 68% by mole or less. When the content of $SiO_2$ is less than 63% by mole, the acid resistance is liable to be lowered.

$Al_2O_3$ is a component for forming a network of glass and increasing a Young's modulus, a specific modulus and fracture toughness and is essential. When the content of $Al_2O_3$ is less than 5% by mole, the Young's modulus becomes low; the specific modulus becomes low; and the fracture toughness becomes low. The content of $Al_2O_3$ is preferably 6% by mole or more, more preferably 7% by mole or more, and typically 8% by mole or more. However, when the content of $Al_2O_3$ exceeds 17% by mole, a thermal expansion coefficient becomes small; viscosity becomes too high so that melting of glass becomes difficult; and acid resistance is lowered. The content of $Al_2O_3$ is preferably 15% by mole or less, and more preferably 14% by mole or less. When the content of $Al_2O_3$ exceeds 12.5% by mole, the acid resistance is liable to be lowered.

As described previously, in a glass in which the content of $SiO_2$ is low, whereas the content of $Al_2O_3$ is high, the acid resistance is low. For that reason, as shown in Table 1, when the $(SiO_2-Al_2O_3)$ value is small, the acid resistance of glass is remarkably lowered. On the other hand, in order to enhance mechanical characteristics such as Young's modulus, specific modulus and fracture toughness, it is effective that the content of $Al_2O_3$ is high, and a glass having excellent mechanical characteristics tends to be low in the acid resistance. According to the invention, by specifying the content of each of $SiO_2$ and $Al_2O_3$ and passing through a step including finish polishing and cleaning after a cleaning step using a cleaning liquid composed of a mixture of sulfuric acid and hydrogen peroxide, it becomes possible to provide a glass substrate with an excellent surface quality, in which the cerium oxide abrasive residue is small or absent. However, when the $(SiO_2-Al_2O_3)$ value exceeds 62% by mole, even by applying the polishing and cleaning process of the invention, the effects are hardly revealed. The $(SiO_2-Al_2O_3)$ value is typically 59% by mole or less and 48% by mole or more. When the $(SiO_2-Al_2O_3)$ value is 50% by mole or more, necessity for providing a repolishing step is low.

Each of $Li_2O$, $Na_2O$ and $K_2O$ is a component for improving melting character of glass and increasing a thermal expansion coefficient, and any one or more of those components must be contained. When the content of the total $R_2O$ including $Li_2O$, $Na_2O$ and $K_2O$ is less than 4% by mole, this effect becomes low. The content of $R_{2O}$ is preferably 13% by mole or more, more preferably 15% by mole or more, especially preferably 16% by mole or more, most preferably 17% by mole or more, and typically 18% by mole or more. However, what the content of $R_2O$ exceeds 27% by mole is not preferable because a Young's modulus becomes low; a specific modulus becomes low; fracture toughness becomes low; an alkali is liable to elute in a reaction with water. The content of $R_2O$ is preferably 25% by mole or less, more preferably 24% by mole or less, and especially preferably 22% by mole or less. The content of $R_2O$ is typically from 16 to 24% by mole.

Also, among the foregoing alkali metal oxides, $Li_2O$ is high in an effect for increasing a Young's modulus, a specific modulus and fracture toughness, and therefore, it is preferable that 5% by mole or more of $Li_2O$ is contained. The content of $Li_2O$ is more preferably 7% by mole or more, and most preferably 8% by mole or more.

Though all of MgO, CaO, SrO and BaO are not essential, they are each a component for improving melting character of glass and increasing a thermal expansion coefficient and may be contained within the range of up to 20% by mole in terms of a content of the total R'O including MgO, CaO, SrO and BaO. However, when the content of R'O exceeds 20% by mole, a specific gravity becomes large, and the glass is liable to be scratched. The content of R'O is preferably 10% by mole or less, more preferably 8% by mole or less, most preferably 6% by mole or less, and typically 4% by mole or less.

In order to increase mechanical characteristics such as Young's modulus, specific modulus, specific gravity, thermal expansion coefficient, scratch resistance and fracture toughness, a total content of $(SiO_2+Al_2O_3+R_2O+R'O)$ is required to be 90% by mole or more. When the total content of $(SiO_2+Al_2O_3+R_2O+R'O)$ is less than 90% by mole, this effect becomes low. The total content of $(SiO_2+Al_2O_3+R_2O+R'O)$ is preferably 93% by mole or more, more preferably 95% by mole or more, and most preferably 97% by mole or more.

Though the alkali aluminosilicate glass in this example is essentially composed of the foregoing components, it may further contain other components so far as the object of the invention is not impaired.

For example, each of $TiO_2$, $ZrO_2$, $Y_2O_3$, $Nb_2O_5$, $Ta_2O_5$ and $La_2O_3$ has an effect for increasing a Young's modulus, a specific modulus and fracture toughness. In the case where any one or more of those components are contained, it is preferable that 7% by mole or less of such a component is contained in terms of a total content. When the total content of $TiO_2$, $ZrO_2$, $Y_2O_3$, $Nb_2O_5$, $Ta_2O_5$ and $La_2O_3$ exceeds 7% by mole, a specific gravity becomes large, and there is a concern that the glass is liable to be scratched. The total content of $TiO_2$, $ZrO_2$, $Y_2O_3$, $Nb_2O_5$, $Ta_2O_5$ and $La_2O_3$ is more preferably less than 5% by mole, especially preferably less than 4% by mole, and most preferably less than 3% by mole.

$B_2O_3$ has effects for improving melting character of glass, decreasing a specific gravity and making glass hard to be scratched. In the case where $B_2O_3$ is contained, its content is preferably 3% by mole or less. When the content of $B_2O_3$ exceeds 3% by mole, a Young's modulus becomes low; a specific modulus becomes low; and there is a concern that the quality of the glass is lowered due to volatilization. The content of $B_2O_3$ is more preferably 2% by mole or less, especially preferably 1% by mole or less, and most preferably 0.5% by mole or less.

Each of $SO_3$, Cl, $As_2O_3$, $Sb_2O_3$, $SnO_2$ and $CeO_2$ has an effect for refining glass. In the case where any one or more of those components are contained, it is preferable that 2% by mole or less of such a component is contained in terms of a total content.

A specific gravity of the glass is preferably 2.60 or less. When the specific gravity of the glass exceeds 2.60, a motor load is applied at the time of rotation of a magnetic disk drive so that a consumed electric power becomes large, or there is a concern that the drive rotation becomes instable. The specific gravity of the glass is preferably 2.55 or less, more preferably 2.53 or less, and most preferably 2.52 or less.

Also, a thermal expansion coefficient (average coefficient of linear expansion) of the glass at a temperature ranging from −50 to +70° C. is preferably $60 \times 10^{-7}$/° C. or more. When the thermal expansion coefficient of the glass is less than 60×

$10^{-7}/°$ C., a difference in the thermal expansion coefficient from other member such as a metal-made drive becomes large so that there is a concern that breakage of the substrate due to stress caused when the temperature is fluctuated is liable to occur. The thermal expansion coefficient of the glass is preferably $62\times10^{-7}/°$ C. or more, more preferably $65\times10^{-7}/°$ C. or more, and most preferably $70\times10^{-7}/°$ C. or more.

Furthermore, the glass preferably has a Young's modulus of 80 GPa or more and a specific modulus of 32 MNm/kg or more. When the Young's modulus of the glass is less than 80 GPa, or the specific modulus of the glass is less than 32 MNm/kg, warp or flexure is liable to be caused during the drive rotation, and there is a concern that it becomes difficult to obtain an information recording medium with a high recording density. It is more preferable that not only the Young's modulus is 81 GPa or more, but the specific modulus is 32.5 MNm/kg or more.

The glass plate having such a glass composition is liable to become excellent in various characteristics required as a glass substrate such as Young's modulus, specific modulus, specific gravity, thermal expansion coefficient, scratch resistance and fracture toughness.

A method for manufacturing a glass plate is not particularly limited, and various methods can be applied. For example, raw materials of respective components which are usually used are mixed so as to have a targeted composition, and this mixture is melted in a glass melting furnace. The glass is homogenized by bubbling, stirring, addition of a refining agent and the like and molded into a sheet glass having a prescribed thickness by a known method such as a float process, a pressing process, a fusion process and a downdraw process; and after annealing, the sheet glass is subjected to processing such as grinding and polishing, if desired and then formed into a glass substrate having prescribed size and shape. As a molding method, in particular, a float process which is suited for mass production is suitable. Also, continuous molding methods other than the float process, namely a fusion process and a downdraw process are suitable.

Subsequently, a circular hole is cored in the center of a circular glass plate, followed by successively performing chamfering, main surface lapping and edge mirror polishing. The main surface lapping step may be divided into a rough lapping step and a precise lapping step, and a shape-processing step (for example, hole-coring in the center of a circular glass plate, chamfering and edge polishing) may be provided between the foregoing steps. Also, the edge mirror polishing may be performed by lamination of circular glass plates, brush polishing of the inner peripheral edge with a cerium oxide abrasive and etching; or in place of the brush polishing of the inner peripheral edge, for example, a polysilazane compound-containing liquid may be coated on the etched inner peripheral edge by a spraying method or the like and then fired, thereby forming a coating film (protective coating film) on the inner peripheral edge. The main surface lapping is usually performed using an aluminum oxide abrasive or an aluminum oxide based abrasive having an average particle size of from 6 to 8 µm. The lapped main surface is usually polished to a removal of from 30 to 40 µm.

In such processing, in the case of manufacturing a glass substrate not having a circular hole in the center thereof, as a matter of course, hole-coring in the center of a circular glass plate and mirror polishing on the inner peripheral edge are not needed.

Thereafter, the main surface of the circular glass plate is polished with a slurry containing a cerium oxide abrasive. This main surface polishing step is performed using a urethane-made polishing pad, and the polishing is performed using, for example, a three-dimensional surface structure analyzer (for example, OPTI-FLAT, manufactured by ADE Corporation) such that a waviness (Wa) as measured under a condition of a wavelength region of $\lambda \leq 5$ mm is 1 nm or less. Also, a removal amount (polishing amount) of the plate thickness by polishing is typically from 5 to 15 µm. The main surface polishing step may be performed by one-time polishing or may be performed two or more times using cerium oxide abrasives having a different size from each other. The cerium oxide abrasive is known, and in general, it includes, in addition to cerium oxide, rare earth elements such as lanthanum, fluorine and the like. Also, the cerium oxide polishing step according to the invention includes a cerium oxide main surface polishing step aiming to remove scratches generated in the lapping step; however, the cerium oxide polishing step according to the invention is not limited thereto, but if the edge mirror polishing is performed after the lapping step, this is also included.

Subsequently, cleaning of the circular glass plate is performed. In this cleaning step, a dipping step with pure water is performed; subsequently, a step of dipping in a heated cleaning liquid containing a mixture of sulfuric acid and aqueous hydrogen peroxide is performed; and finally, a step of rinsing with pure water is performed. A pre-cleaning step using an acidic detergent or an alkaline detergent may be performed prior to this cleaning step. Also, in the dipping step or rinsing step with pure water, ultrasonic cleaning may be performed jointly, or cleaning with running water or shower water may be performed.

In the cleaning liquid, a sulfuric acid concentration is 20% by mass or more and 80% by mass or less, and a hydrogen peroxide concentration is 1% by mass or more and 10% by mass or less; and preferably, the sulfuric acid concentration is 50% by mass or more and 80% by mass or less, and the hydrogen peroxide concentration is 3% by mass or more and 10% by mass or less. In the case where the concentration of each of sulfuric acid and hydrogen peroxide is lower than the foregoing range, the cerium oxide abrasive remains without being dissolved. In the case where the concentration of each of sulfuric acid and hydrogen peroxide is more than the foregoing range, the surface roughing of the foregoing alkali aluminosilicate glass to be caused by leaching becomes remarkable; even when finish polishing as described later is performed, not only the targeted flatness is hardly obtainable, but generally used resin-made jigs for glass are oxidized and decomposed; and therefore, such is not preferable. Also, for the same reasons, a liquid temperature of the cleaning liquid is 50° C. or higher and 100° C. or less, and a dipping time is 5 minutes or more and 30 minutes or less. In detail, it is preferable that dipping is performed under a condition of using a cleaning liquid at 50° C. or higher and lower than 60° C. for 25 minutes or more and 30 minutes or less, a cleaning liquid at 60° C. or higher and lower than 70° C. for 15 minutes or more and 30 minutes or less, or a cleaning liquid at 70° C. or higher and 100° C. or less for 5 minutes or more and 30 minutes or less.

In the foregoing cleaning step, since sulfuric acid is used, there may be the case where uneven leaching occurs, and the main surface of the circular glass plate is again polished, thereby improving the flatness (finish polishing step). Also, though there may be the case where the cerium oxide abrasive remaining on the edge of the circular glass plate is reattached onto the main surface, this reattached abrasive is also removed.

In the finish polishing step, final polishing with a slurry containing a colloidal silica abrasive is performed. In the finish polishing step, the final polishing may be performed only by performing polishing with a slurry containing a colloidal silica abrasive having an average particle size of 10 nm or more and 50 nm or less; or the final polishing may be performed by performing pre-polishing with a slurry containing a colloidal silica abrasive having an average particle size of more than 50 nm and 100 nm or less and then performing finish polishing with a slurry containing a colloidal silica abrasive having an average particle size of 10 nm or more and 50 nm or less.

In the case of a glass with inferior acid resistance, it is preferable that polishing is performed using a slurry containing a cerium oxide abrasive and a suede pad prior to the finish polishing step (repolishing step). This suede pad is preferably one obtained by sticking a foamed resin layer having a Shore A hardness of 60° or less to PET or a nonwoven fabric. When the Shore A hardness exceeds 60°, there may be the case where it is necessary to make a porosity low, and there is a concern that hydrophilicity is hardly kept. Also, the Shore A hardness is preferably 20° or more. When the Shore A hardness is less than 20°, a possibility that a polishing rate becomes slow becomes high. Also, this foamed resin layer may be a single layer, or it may be one obtained by superposing two or more foamed layers in a different foamed state. In the latter case, it is preferable that the Shore A hardness of a first foamed resin layer coming into contact with the glass is 20° or more and 50° or less, whereas the Shore A hardness of a second foamed resin layer as a lower layer is 40° or more and 60° or less, and hence, the first foamed resin layer is lower in the hardness than the second foamed resin layer. Also, such a foamed resin layer is typically made of polyurethane. In particular, the suede pad is typically one made of a foamed urethane resin having a Shore A hardness of from 30° to 60°, a compressibility of from 0.5 to 10% and a density of from 0.2 to 0.9 g/cm$^3$.

The slurry containing a cerium oxide abrasive is preferably an alkaline aqueous slurry having a pH of 8 or more. By adjusting the pH, dispersibility of the cerium oxide abrasive is enhanced so that the abrasive residue in an outer peripheral end part of the circular glass plate can be highly suppressed.

Also, the abrasive size is preferably 0.1 µm or more in terms of a reduced diameter obtained from a BET specific surface area. When the abrasive size is less than 0.1 µm, the abrasive is liable to be plugged in the foamed resin layer of the suede pad, and there is a concern that the polishing rate is lowered. In order to suppress coagulation of the cerium oxide abrasive, it is also possible to contain a polycarboxylic acid salt or an organic acid salt in the slurry. In general, a polyacrylic acid salt, a polysulfonic acid salt, a polymaleic acid salt or a copolymer thereof is frequently used, and such a material having a molecular weight of 2,000 or more and 100,000 or less is added in an amount of from 0.1 to 5 parts by mass relative to the amount of the abrasive.

The Shore A hardness is measured by a method for measuring a durometer A hardness of a plastic as stipulated in JIS K7215. Also, the compressibility (unit: %) is measured in the following manner. That is, with respect to a measuring sample cut out into an appropriate size from the polishing pad, a material thickness $t_0$ at the time of applying a load of a stress of 10 kPa from a non-loaded state for 30 seconds using a Schopper type thickness gauge is determined; subsequently, a material thickness $t_1$ at the time of applying a load of a stress of 110 kPa immediately from the state where the thickness is $t_0$ for 5 minutes is determined; and $\{(t_0-t_1)\times 100\}/t_0$ is then calculated from the $t_0$ and $t_1$ values, and this is defined as the compressibility.

According to polishing with a slurry containing a colloidal silica abrasive, in the colloidal silica formed of water glass as a raw material, in general, gelation is liable to proceed in a neutral region, and therefore, the polishing is preferably performed at a pH of 1 or more and 6 or less or 2 or more and 6 or less, or at a pH of 8 or more and 12 or less. As a pH modifier in the case of an acidic region at a pH of 1 or more and 6 or less, an inorganic acid or an organic acid is used as an acid. Examples of the inorganic acid include hydrochloric acid, nitric acid, sulfuric acid, phosphoric acid, polyphosphoric acid and amide sulfuric acid. Also, examples of the organic acid include carboxylic acids, organic phosphoric acids and amino acids. Examples of the carboxylic acid include monovalent carboxylic acids such as acetic acid, glycolic acid and ascorbic acid; divalent carboxylic acids such as oxalic acid and tartaric acid; and trivalent carboxylic acids such as citric acid. In particular, it is preferable to adjust the pH to 1 or more and 3 or less, and in that case, an inorganic acid is suitably used. Also, in the case where the pH exceeds 3, the use of a carboxylic acid is preferable because gelation of the colloidal silica abrasive can be suppressed. Furthermore, an anionic or nonionic surfactant may be added to the slurry. On the other hand, as a pH modifier in the case of adjusting the pH to 8 or more and 12 or less, it is possible to contain at least one inorganic alkali such as sodium hydroxide, potassium hydroxide and lithium hydroxide or organic alkali such as ammonia and an amine. Also, it is possible to add a surfactant of every kind. A polishing tool is preferably a suede pad. This suede pad is typically the suede pad which is considered to be preferably used in the foregoing repolishing step, and a foamed resin layer thereof preferably has a Shore A hardness of 20° or more and 60° or less and a density of 0.2 g/cm$^3$ or more and 0.8 g/cm$^3$ or less.

Also, the finish polishing step can be performed without going through polishing (repolishing step) with a slurry containing a cerium oxide abrasive.

After the cleaning step with sulfuric acid and hydrogen peroxide, what polishing method should be performed is chosen among the foregoing methods depending upon the state of the main surface of the circular glass plate after cleaning. Since the glass is inferior in the acid resistance, in the case where the surface roughing of the main surface is remarkable, it is preferable that after polishing with a slurry containing a cerium oxide abrasive is performed, final polishing with a slurry containing a colloidal silica abrasive is performed. In the case where the surface roughing of the main surface is on a medium level, after polishing with a slurry containing a colloidal silica abrasive having an average particle size of more than 50 nm and 100 nm or less is performed without performing polishing with a slurry containing a cerium oxide abrasive, polishing with a slurry containing a colloidal silica abrasive having an average particle size of 10 nm or more and 50 nm or more may be performed. Also, in the case where the surface roughing of the main surface is low, polishing with a slurry containing a colloidal silica abrasive having an average particle size of 10 nm or more and 50 nm or less may be performed without performing polishing with a slurry containing a cerium oxide abrasive.

According to the foregoing finish polishing step, it is preferable that the circular glass plate is polished so as to have flatness such that a root mean square roughness (Rms) of the main surface is 0.15 nm or less, and preferably 0.13 nm or less. A removal amount (polishing amount) of the plate thickness in this polishing is typically from 0.5 to 2 µm.

After the finish polishing step, cleaning is performed for the purpose of removing the colloidal silica abrasive. In this cleaning step, it is preferable to perform cleaning with an alkaline detergent having a pH of 10 or more at least one time. As to the cleaning method, ultrasonic vibration may be applied while dipping the circular glass plate therein, or scrub cleaning may be applied. Also, the both may be combined. Furthermore, it is preferable to perform a dipping step or rinsing step with pure water before or after the cleaning.

After the final rinsing step, the circular glass plate is dried. As a drying method, a drying method using an isopropyl alcohol vapor, spin drying, vacuum drying and the like are adopted.

The glass substrate of the invention is obtained through the foregoing series of steps, and the main surface thereof is free from the residual cerium oxide abrasive and is highly flattened. For that reason, the magnetic recording medium of the invention having a magnetic recording medium coated on the main surface thereof makes it possible to achieve high-density recording.

EXAMPLES

The invention is specifically described below by reference to the following Examples, but it should not be construed that the invention is limited thereto.

(Test 1)

Figure 1:
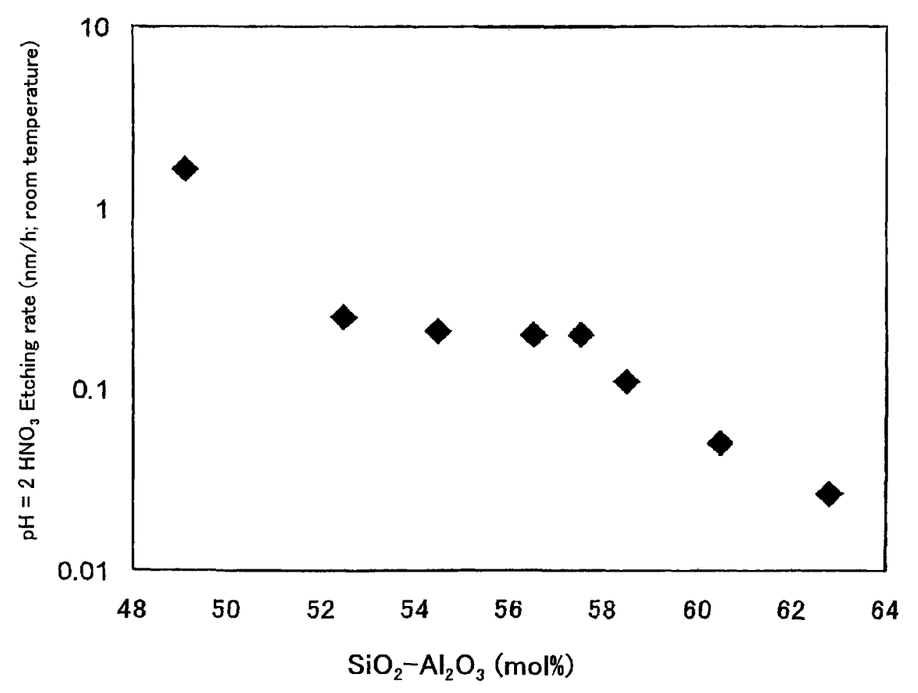
FIG. 1 is a graph showing a relation between an ($SiO_2-Al_2O_3$) value and an etching rate in a glass plate.

Each of Glass Plates A to H Having a Composition Shown in Table 1 was prepared. In Table 1, the term "Si+Al+R'+R" represents ($SiO_2+Al_2O_3+R_2O+R'O$), and the term "a" represents an average coefficient of linear expansion (unit: $10^{-7}$/° C.) at a temperature ranging from −50° C. to +70° C. Also, a unit of the Young's modulus is GPa, and a unit of the specific modulus is MNm/kg. Also, an etching rate (nm/h; using nitric acid at a pH of 2 at room temperature) of each of the glass plates was measured. The results are shown in a row of "Acid resistance" in Table 1, and a graph in which a relation between a ($SiO_2-Al_2O_3$) value and this etching rate is plotted is shown in FIG. 1. It is noted that the smaller the ($SiO_2-Al_2O_3$) value, the more inferior the acid resistance is. Though the glass plates other than the glass plate B meet the composition of the glass plate which is used in the invention, all of those glass plates are inferior in the acid resistance to the glass plate B.

Subsequently, the edges of the inner and outer peripheries were subjected to chamfering processing in a chamfering width of 0.15 mm at a chamfering angle of 45°.

After the chamfering, the edges were subjected to mirror polishing by means of brush polishing with a slurry containing a cerium oxide abrasive as an abrasive and using a brush as a polishing tool. The polishing amount was 30 μm in terms of a removal amount in the radial direction.

After the mirror polishing, the top and bottom surfaces were subjected to polishing processing by a double side polishing apparatus using a slurry containing a cerium oxide abrasive (average particle size: about 2 μm) as an abrasive and using a polyurethane pad as a polishing tool. The polishing amount was 35 μm in total in the thickness direction of the top and bottom main surfaces.

Subsequently, the top and bottom surfaces were subjected to finish polishing by a double side polishing apparatus using a slurry containing a colloidal silica abrasive (average particle size: 30 nm) as an abrasive, a pH of which was adjusted to 5 for the glass plate A and 2 for the glass plate B, respectively and using, as a polishing tool, a suede pad (Shore A hardness: about 42° prepared by laminating a foamed polyurethane layer having a Shore A hardness of 55° on a polyethylene terephthalate layer and further laminating a foamed polyurethane layer having a Shore A hardness of 34° thereon. The polishing amount was 1 μm in total in the thickness direction of the top and bottom main surfaces.

Subsequently, as a cleaning step for removing the colloidal silica, dipping and cleaning with an alkaline detergent, scrub cleaning, ultrasonic cleaning, rinsing with pure water and drying with an isopropyl alcohol vapor were successively performed.

TABLE 1

Glass composition and physical properties

| (% by mole) | Glass plate B | Glass plate C | Glass plate D | Glass plate E | Glass plate F | Glass plate G | Glass plate H | Glass plate A |
|---|---|---|---|---|---|---|---|---|
| $SiO_2$ | 67.7 | 65.0 | 64.5 | 66.0 | 64.5 | 64.5 | 66.0 | 62.1 |
| $Al_2O_3$ | 4.9 | 6.5 | 8.0 | 8.5 | 10.0 | 12.0 | 5.5 | 13.0 |
| MgO | 10.9 | 8.0 | 5.0 |  | 5.0 |  | 8.0 | 3.0 |
| CaO |  |  |  |  |  | 2.0 |  |  |
| SrO |  |  |  |  |  |  |  |  |
| BaO |  |  |  |  |  |  |  |  |
| $Li_2O$ |  | 8.4 | 10.5 | 12.0 | 10.5 | 12.8 | 8.4 | 10.7 |
| $Na_2O$ | 4.9 | 5.0 | 6.0 | 11.0 | 6.0 | 5.5 | 4.0 | 6.8 |
| $K_2O$ | 7.6 | 4.6 | 3.0 |  | 3.0 | 3.4 | 4.6 | 3.0 |
| $TiO_2$ | 4.0 |  | 1.0 |  | 1.0 |  |  | 0.8 |
| $ZrO_2$ |  | 2.5 | 2.0 | 2.5 |  | 1.8 | 1.5 | 0.6 |
| R'O | 10.9 | 8.0 | 5.0 | 0.0 | 5.0 | 0.0 | 10.0 | 3.0 |
| $R_2O$ | 12.5 | 18.0 | 19.5 | 23.0 | 19.5 | 21.7 | 17.0 | 20.5 |
| Si + Al + R' + R | 96.0 | 97.5 | 97.0 | 97.5 | 99.0 | 98.2 | 98.5 | 98.6 |
| $SiO_2-Al_2O_3$ | 62.8 | 58.5 | 56.5 | 57.5 | 54.5 | 52.5 | 60.5 | 49.1 |
| Specific gravity | 2.46 | 2.51 | 2.50 | 2.51 | 2.45 | 2.47 | 2.49 | 2.47 |
| α | 73 | 73 | 72 | 75 | 73 | 74 | 72 | 73 |
| Young's modulus | 72 | 83 | 85 | 83 | 83 | 83 | 82 | 83 |
| Specific modulus | 29 | 33 | 34 | 33 | 34 | 33 | 33 | 34 |
| Acid resistance | 0.03 | 0.11 | 0.20 | 0.20 | 0.21 | 0.25 | 0.05 | 1.6 |

A doughnut-shaped circular glass plate (circular glass plate having a circular hole in the center thereof) having an outer diameter of 65 mm, an inner diameter of 20 mm and a plate thickness of 0.635 mm was cut out from each of the glass plate A having the lowest acid resistance and the glass plate B having the highest acid resistance; the inner peripheral surface and the outer peripheral surface were subjected to grinding processing with a diamond grindstone; and the top and bottom main surfaces were subjected to lapping with an aluminum oxide abrasive.

A root mean square roughness (Rms) of the main surface was measured by AFM (model No.: DIMENSION 3100, manufactured by Veeco Instruments Inc.). As a result, all of the glass A and the glass B had an Rms of from 0.10 to 0.13 nm. Subsequently, cleaning was performed under a condition shown in Table 2 while dipping in a cleaning liquid containing sulfuric acid and hydrogen peroxide. Thereafter, a root mean square roughness (Rms) of the main surface was measured by AFM (model No.: DIMENSION 3100, manufactured by Veeco Instruments Inc.). The results are shown in Table 2.

TABLE 2

Verification of glass composition

| | Sulfuric acid (% by mass) | Hydrogen peroxide (% by mass) | Dipping time (min) | Liquid temperature (° C.) | Rms (nm) Glass plate A | Rms (nm) Glass plate B |
|---|---|---|---|---|---|---|
| Trial 1 | 71.4 | 7.7 | 15 | 50 | 0.145 | 0.112 |
| Trial 2 | 71.4 | 7.7 | 15 | 80 | 0.174 | 0.114 |
| Trial 3 | 71.4 | 7.7 | 15 | 90 | 0.243 | 0.118 |

As shown in Table 2, it has been confirmed that though the glass plate A has the glass composition according to the invention, it is liable to cause uneven leaching, and the uneven leaching becomes remarkable with an increase of the liquid temperature of the cleaning liquid.

(Test 2)

A circular glass plate was cut out from the glass plate A and subjected to grinding processing of the inner peripheral surface and the outer peripheral surface, lapping of the top and bottom surfaces, chamfering and mirror polishing of the inner and outer peripheries and polishing processing of the top and bottom main surfaces with a slurry containing a cerium oxide abrasive under the same processing conditions as in TEST 1.

After polishing of the main surfaces, the circular glass plate was subjected to pre-cleaning by means of dipping and cleaning with pure water, ultrasonic cleaning with an alkaline detergent and rinsing with pure water, followed by cleaning under the conditions shown in Tables 3 to 5.

After the cleaning, repolishing with a slurry containing a colloidal silica abrasive was performed under the same conditions as in TEST 1, followed by cleaning and drying.

Then, the outer peripheral edge of the circular glass plate was observed using SEM-EDX (an apparatus name: S4700, manufactured by Hitachi, Ltd.), thereby examining the residual state of the cerium oxide abrasive. That is, arbitrarily chosen eight points of the outer peripheral end part were enlargedly displayed by a factor of 5,000 using SEM, the number of granular deposits was measured, and the granular deposit was subjected to an elemental analysis by EDX, thereby confirming whether or not it was cerium oxide. The results are shown in Tables 3 to 5. The case where no deposit is found in all of the eight places is defined as "A"; the case where the deposit is found in 1 to 4 places is defined as "B"; and the case where the deposit is found in 5 or more places is defined as "C".

Trials Nos. 28 and 29 express estimated values from other results.

TABLE 3

Verification of hydrogen peroxide concentration

| Trial No. | Sulfuric acid (% by mass) | Hydrogen peroxide (% by mass) | Dipping time (min) | Liquid temperature (° C.) | Residual state of cerium oxide abrasive |
|---|---|---|---|---|---|
| 1 | 71.4 | 7.7 | 15 | 80 | A |
| 2 | 71.4 | 3.0 | 15 | 80 | A |
| 3 | 71.4 | 1.1 | 15 | 80 | A |
| 4 | 71.4 | 0.5 | 15 | 80 | B |
| 5 | 71.4 | 0 | 15 | 80 | C |

TABLE 4

Verification of sulfuric acid concentration

| Trial No. | Sulfuric acid (% by mass) | Hydrogen peroxide (% by mass) | Dipping time (min) | Liquid temperature (° C.) | Residual state of cerium oxide abrasive |
|---|---|---|---|---|---|
| 6 | 71.4 | 7.7 | 15 | 80 | A |
| 7 | 60.0 | 7.7 | 15 | 80 | B |
| 8 | 50.0 | 7.7 | 15 | 80 | B |
| 9 | 40.0 | 7.7 | 15 | 80 | B |
| 10 | 20.0 | 7.7 | 15 | 80 | B |
| 11 | 0 | 7.7 | 15 | 80 | C |

TABLE 5

Verification of dipping time and liquid temperature

| Trial No. | Sulfuric acid (% by mass) | Hydrogen peroxide (% by mass) | Dipping time (min) | Liquid temperature (° C.) | Residual state of cerium oxide abrasive |
|---|---|---|---|---|---|
| 12 | 71.4 | 7.7 | 5 | 50 | C |
| 13 | 71.4 | 7.7 | 10 | 50 | C |
| 14 | 71.4 | 7.7 | 15 | 50 | C |
| 15 | 71.4 | 7.7 | 30 | 50 | B |
| 16 | 71.4 | 7.7 | 5 | 65 | C |
| 17 | 71.4 | 7.7 | 10 | 65 | C |
| 18 | 71.4 | 7.7 | 15 | 65 | B |
| 19 | 71.4 | 7.7 | 30 | 65 | A |
| 20 | 71.4 | 7.7 | 5 | 80 | A |
| 21 | 71.4 | 7.7 | 10 | 80 | A |
| 22 | 71.4 | 7.7 | 15 | 80 | A |
| 23 | 71.4 | 7.7 | 30 | 80 | A |
| 24 | 71.4 | 7.7 | 5 | 95 | A |
| 25 | 71.4 | 7.7 | 10 | 95 | A |
| 26 | 71.4 | 7.7 | 15 | 95 | A |
| 27 | 71.4 | 7.7 | 30 | 95 | A |
| 28 | 20.0 | 7.7 | 30 | 50 | A |
| 29 | 20.0 | 0.5 | 30 | 50 | B |

From Tables 3 to 5, the cleaning conditions according to the invention have been confirmed.

(Test 3)

A circular glass plate was cut out from the glass plate A and subjected to grinding processing of the inner peripheral surface and the outer peripheral surface, lapping of the top and bottom surfaces, chamfering and mirror polishing of the inner and outer peripheries and polishing processing of the top and bottom main surfaces with a slurry containing a cerium oxide abrasive under the same processing conditions as in TEST 1.

After polishing of the main surfaces, the circular glass plate was subjected to pre-cleaning by means of dipping and cleaning with pure water, ultrasonic cleaning with an alkaline detergent and rinsing with pure water, followed by cleaning under the conditions shown in Trial I of Table 6.

After the cleaning, the top and bottom surfaces were subjected to polishing processing with a slurry containing a cerium oxide abrasive having an average particle size of 1

μmφ and using a suede pad (repolishing step). At that time, the polishing amount was 2.5 μm. Thereafter, finish polishing with a slurry containing a colloidal silica abrasive was performed, followed by cleaning and drying under the same conditions as in TEST 1.

Then, the outer peripheral edge of the circular glass plate was observed using SEM-EDX in the same manner as in TEST 2, thereby examining the residual state of the cerium oxide abrasive. The results are shown in Trial I of Table 6.

(Test 4)

A circular glass plate was cut out from the glass plate A and subjected to grinding processing of the inner peripheral surface and the outer peripheral surface, lapping of the top and bottom surfaces, chamfering and mirror polishing of the inner and outer peripheries and polishing processing of the top and bottom main surfaces with a slurry containing a cerium oxide abrasive under the same processing conditions as in TEST 1.

After polishing of the main surfaces, the circular glass plate was subjected to pre-cleaning by means of dipping and cleaning with pure water, ultrasonic cleaning with an alkaline detergent and rinsing with pure water, followed by cleaning under the conditions shown in Trial II of Table 6.

After the cleaning, the top and bottom surfaces were subjected to polishing processing with a slurry containing a cerium oxide abrasive having an average particle size of 1 μmφ and using a hard polyurethane pad having a Shore D hardness of 55° (90° or more in terms of a Shore A hardness) (repolishing step). At that time, the polishing amount was 2.5 μm. Thereafter, finish polishing with a slurry containing a colloidal silica abrasive was performed, followed by cleaning and drying under the same conditions as in TEST 1.

Then, the outer peripheral edge of the circular glass plate was observed using SEM-EDX in the same manner as in TEST 2, thereby examining the residual state of the cerium oxide abrasive. The results are shown in Trial II of Table 6.

TABLE 6

Verification of pad hardness in repolishing step

| | Sulfuric acid (% by mass) | Hydrogen peroxide (% by mass) | Dipping time (min) | Liquid temperature (° C.) | Residual state of cerium oxide abrasive |
|---|---|---|---|---|---|
| Trial I | 71.4 | 7.7 | 15 | 80 | B |
| Trial II | 71.4 | 7.7 | 15 | 80 | C |

(Test 5)

Cleaning was performed according to TEST 2, except for using a cleaning liquid composed of 3% by mass of ascorbic acid and 1% by mass of nitric acid and having a liquid temperature of 60° C. in place of the cleaning liquid containing sulfuric acid hydrogen peroxide. The residual state of the cerium oxide abrasive was examined. As a result, the residual state of the cerium oxide abrasive was found to be "C" on the basis of determination of TEST 2.

(Test 6)

After cleaning with a cleaning liquid containing sulfuric acid and hydrogen peroxide according to TEST 2, the residual state of the cerium oxide abrasive was examined without performing repolishing with a slurry containing a colloidal silica abrasive. As a result, the residual state of the cerium oxide abrasive was found to be "B" on the basis of determination of TEST 2. However, surface roughing was observed.

While the invention has been described in detail and with reference to specific embodiments thereof, it will be apparent to one skilled in the art that various changes and modifications can be made therein without departing from the spirit and scope thereof.

This application is based on Japanese Patent Application No. 2009-162746 filed on Jul. 9, 2009, the entirety of which is incorporated herein by way of reference.

All references cited herein are incorporated by reference herein in their entirety.

According to the present invention, a glass substrate for magnetic recording medium which is thoroughly adaptive with a high recording capacity which will be demanded in the future is provided.

What is claimed is:

1. A method for manufacturing a glass substrate for information recording medium, said method comprising: a lapping step of lapping a circular glass plate made of an alkali aluminosilicate glass; and a subsequent cerium oxide polishing step of polishing the circular glass plate with a slurry containing a cerium oxide abrasive, wherein a difference ($SiO_2-Al_2O_3$) obtained by subtracting an $Al_2O_3$ content from an $SiO_2$ content in the alkali aluminosilicate glass is 62% by mole or less;

and wherein said method further comprises:

subsequently to the cerium oxide polishing step, a detergent rinsing step, and subsequently to the detergent rinsing step, a cleaning step of cleaning the circular glass plate with a cleaning liquid having a sulfuric acid concentration of 50% by mass or more and 80% by mass or less and a hydrogen peroxide concentration of 3% by mass or more and 10% by mass or less at a liquid temperature of 50° C. or higher and 100° C. or lower, and after the cleaning step, a finish polishing step of polishing a main surface of the circular glass plate with a slurry containing a colloidal silica abrasive.

2. The method for manufacturing a glass substrate for information recording medium according to claim 1, wherein the alkali aluminosilicate glass has a composition of from 55 to 75% by mole of $SiO_2$, from 5 to 17% by mole of $Al_2O_3$, from 4 to 27% by mole of $Li_2O+Na_2O+K_2O$, from 0 to 20% by mole of $MgO+CaO+SrO+BaO$, provided that $SiO_2+Al_2O_3+Li_2O+Na_2O+K_2O+MgO+CaO+SrO+BaO$ is 90% by mole or more.

3. The method for manufacturing a glass substrate for information recording medium according to claim 2, wherein in the composition of the alkali aluminosilicate glass, $SiO_2$ is 63% by mole or more, $Li_2O+Na_2O+K_2O$ is 16% by mole or more, and $MgO+CaO+SrO+BaO$ is from 0 to 10% by mole.

4. The method for manufacturing a glass substrate for information recording medium according to claim 1, wherein the colloidal silica abrasive has an average particle size of 10 nm or more and 50 nm or less.

5. The method for manufacturing a glass substrate for information recording medium according to claim 4, wherein the slurry containing a colloidal silica abrasive has a pH of 1 or more and 6 or less.

6. The method for manufacturing a glass substrate for information recording medium according to claim 1, wherein the difference ($SiO_2-Al_2O_3$) obtained by subtracting an $Al_2O_3$ content from an $SiO_2$ content in the alkali aluminosilicate glass is 50% by mole or more and 62% by mole or less.

7. The method for manufacturing a glass substrate for information recording medium according to claim 6, wherein the alkali aluminosilicate glass has a composition of from 63 to 71% by mole of $SiO_2$, from 7 to 12.5% by mole of $Al_2O_3$, from 16 to 24% by mole of $Li_2O+Na_2O+K_2O$, from 0 to 10% by mole of $MgO+CaO+SrO+BaO$, provided that $SiO_2+Al_2O_3+Li_2O+Na_2O+K_2O+MgO+CaO+SrO+BaO$ is 90% by mole or more.

8. The method for manufacturing a glass substrate for information recording medium according to claim 1, wherein a repolishing step of polishing the main surface of the circular glass plate with a slurry containing a cerium oxide abrasive and using a polishing pad having a foamed resin layer having a Shore A hardness of 60° or less is included between the cleaning step and the finish polishing step.

9. The method for manufacturing a glass substrate for information recording medium according to claim 4, wherein a step of polishing the main surface of the circular glass plate with a slurry containing a colloidal silica abrasive having an average particle size of more than 50 nm and 100 nm or less and having a pH of 8 or more and 12 or less is included between the cleaning step and the finish polishing step.

10. The method for manufacturing a glass substrate for information recording medium according to claim 8, wherein the difference ($SiO_2-Al_2O_3$) obtained by subtracting an $Al_2O_3$ content from an $SiO_2$ content in the alkali aluminosilicate glass is 45% by mole or more and less than 50% by mole.

11. The method for manufacturing a glass substrate for information recording medium according to claim 10, wherein the alkali aluminosilicate glass has a composition of from 60% by mole or more and less than 63% by mole of $SiO_2$, from 12.5 to 15% by mole of $Al_2O_3$, from 18 to 22% by mole of $Li_2O+Na_2O+K_2O$, from 0 to 6% by mole of $MgO+CaO+SrO+BaO$, provided that $SiO_2+Al_2O_3+Li_2O+Na_2O+K_2O+MgO+CaO+SrO+BaO$ is 90% by mole or more.

12. The method for manufacturing a glass substrate for information recording medium according to claim 1, wherein in the cleaning step, the circular glass plate is dipped in the cleaning liquid at 500° C. or higher and lower than 600° C. for 25 minutes or more and 30 minutes or less, the cleaning liquid at 600° C. or higher and lower than 700° C. for 15 minutes or more and 30 minutes or less, or the cleaning liquid at 700° C. or higher and 1000° C. or lower for 5 minutes or more and 30 minutes or less.

13. The method for manufacturing a glass substrate for information recording medium according to claim 1, wherein in the finish polishing step, a root mean square roughness (Rms) of the main surface of the circular glass plate is regulated to 0.15 nm or less.

14. The method for manufacturing a glass substrate for information recording medium according to claim 1, wherein a cleaning step of cleaning the circular glass plate with an alkaline detergent having a pH of 10 or more is included after the finish polishing step.

15. The method for manufacturing a glass substrate for information recording medium according to claim 1, wherein the detergent rinsing step comprises rinsing with an alkaline detergent.

16. The method for manufacturing a glass substrate for information recording medium according to claim 1, wherein the detergent rinsing step comprises rinsing with an acidic detergent.

* * * * *